United States Patent
Nagel et al.

(10) Patent No.: US 12,498,439 B2
(45) Date of Patent: Dec. 16, 2025

(54) INDUCTIVE CONDUCTIVITY SENSOR CIRCUIT, INDUCTIVE CONDUCTIVITY SENSOR AND METHOD OF OPERATING THE CIRCUIT

(71) Applicant: Endress+Hauser Conducta GmbH+Co. KG, Gerlingen (DE)

(72) Inventors: Thomas Nagel, Dresden (DE); Hermann Günther, Dresden (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 450 days.

(21) Appl. No.: 18/054,210

(22) Filed: Nov. 10, 2022

(65) Prior Publication Data

US 2023/0152408 A1    May 18, 2023

(30) Foreign Application Priority Data

Nov. 12, 2021    (DE) ............... 10 2021 129 602.1

(51) Int. Cl.
| | | |
|---|---|---|
| *G01R 23/06* | (2006.01) | |
| *G01R 23/12* | (2006.01) | |
| *G01R 27/26* | (2006.01) | |
| *G01R 35/00* | (2006.01) | |

(52) U.S. Cl.
CPC ........... *G01R 35/005* (2013.01); *G01R 23/06* (2013.01); *G01R 23/12* (2013.01); *G01R 27/2611* (2013.01)

(58) Field of Classification Search
CPC ...... G01R 35/005; G01R 23/06; G01R 23/12; G01R 27/2611
See application file for complete search history.

(56) References Cited

U.S. PATENT DOCUMENTS

| | | | | |
|---|---|---|---|---|
| 2011/0001490 A1* | 1/2011 | Eberheim | ............... | G01N 27/74 |
| | | | | 324/654 |
| 2017/0138767 A1* | 5/2017 | Sohler | .................. | G01D 5/2291 |

FOREIGN PATENT DOCUMENTS

| | | | | |
|---|---|---|---|---|
| DE | 4116468 | C2 | 3/1993 | |
| DE | 102006038648 | B4 | 6/2008 | |
| DE | 102009026403 | A1 * | 11/2010 | ........... G01N 27/023 |
| WO | WO-2009024479 | A1 * | 2/2009 | ........... G01N 27/023 |
| WO | 2010006749 | A1 | 1/2010 | |

* cited by examiner

*Primary Examiner* — Lee E Rodak
*Assistant Examiner* — Taqi R Nasir
(74) *Attorney, Agent, or Firm* — Mark A. Logan; Endress+Hauser (USA) Holding, Inc.

(57) ABSTRACT

A circuit for an inductive conductivity sensor comprises: a secondary coil having a first coil terminal and a second coil terminal, a switch having a first switch terminal, a second switch terminal, a third switch terminal, a first potential terminal, and a control unit having a first control terminal and a second control terminal, wherein the first coil terminal is connected to the first control terminal and the second coil terminal is connected to the first switch terminal, wherein the second switch terminal is connected to the first potential terminal and the third switch terminal is connected to the second control terminal.

10 Claims, 1 Drawing Sheet

INDUCTIVE CONDUCTIVITY SENSOR CIRCUIT, INDUCTIVE CONDUCTIVITY SENSOR AND METHOD OF OPERATING THE CIRCUIT

CROSS-REFERENCE TO RELATED APPLICATION

The present application is related to and claims the priority benefit of German Patent Application No. 10 2021 129 602.1, filed on Nov. 12, 2021, the entire contents of which are incorporated herein by reference.

TECHNICAL FIELD

The present disclosure relates to a circuit for an inductive conductivity sensor, an inductive conductivity sensor, and a method for operating the circuit.

BACKGROUND

In analytical measurement technology, especially in the fields of water management; of environmental analysis; in industry, for example in food technology, biotechnology, and pharmaceutics; as well as for the most varied laboratory applications, measurands, such as the pH value, the conductivity, or even the concentration of analytes, such as ions or dissolved gases in a gaseous or liquid measurement medium, are of great importance. These measurands can be acquired and/or monitored, for example, by means of electrochemical sensors, such as optical, potentiometric, amperometric, voltammetric, or coulometric sensors, or even conductivity sensors.

It is generally desired that sensors function reliably for as long as possible and, in the event that a malfunction occurs, this is detected as quickly as possible.

Given inductive conductivity sensors which have a transmitting coil and a receiving coil, it is necessary for this reason to check from time to time that, for example, no interturn fault is present in any of the coils.

In the prior art, it was previously so that a conductor loop with predetermined reference resistances was added between the transmitting coil and the receiving coil in order to test the function of the receiving coil. However, the presence of the conductor loop leads to a signal distortion of up to 5%, especially if the inductive conductivity sensor is used for measuring highly conductive media. Thus, as of yet no solutions have been known in the prior art to reliably test the function, especially of the receiving coil, even in highly conductive media without needing to disassemble the inductive conductivity sensor.

SUMMARY

It is therefore an object of the present disclosure to provide a circuit for an inductive conductivity sensor which allows the described disadvantages of the prior art to be overcome.

This object is achieved according to the present disclosure by a circuit for an inductive conductivity sensor.

The circuit according to the present disclosure comprises:
a secondary coil having a first coil terminal and a second coil terminal,
a switch having a first switch terminal, a second switch terminal, a third switch terminal,
a first potential terminal,
a control unit having a first control terminal and a second control terminal,
wherein the first coil terminal is connected to the first control terminal and the second coil terminal is connected to the first switch terminal, wherein the second switch terminal is connected to the first potential terminal and the third switch terminal is connected to the second control terminal,
wherein the control unit is suitable for switching the switch between a first position, in which the first switch terminal is connected to the second switch terminal, and a second position, in which the first switch terminal is connected to the third switch terminal,
wherein the control unit is suitable for emitting a test signal at the second control terminal, and is suitable for receiving and evaluating the test signal as a test response at the first control terminal,
wherein the secondary coil is suitable for detecting a measurement signal, and the control unit is suitable for receiving and evaluating the measurement signal at the first control terminal.

Using the circuit according to the present disclosure, it is enabled to test the secondary coil of an inductive conductivity sensor for proper functioning, independently of its primary coil. It is likewise achieved that components in the circuit of the secondary coil can be tested for proper functioning in a test mode. In addition, thanks to the circuit, it is achieved that a signal distortion in the measurement mode is minimized or prevented. It is thus ultimately achieved that the disadvantages of existing inductive conductivity sensors are overcome.

According to one embodiment of the present disclosure, a first amplifier and a voltage divider having a first resistance and a second resistance are arranged between the second control terminal and the third switch terminal. The voltage divider has a first voltage divider terminal, which is connected to the first resistance and the second control terminal, and has a second voltage divider terminal, which is connected to the second resistance and a second potential terminal, and has a third voltage divider terminal, which is arranged between the first resistance and the second resistance. The first amplifier has an amplifier input which is connected to the third voltage divider terminal and has an amplifier output which is connected to the third switch terminal.

According to a further embodiment of the present disclosure, a second amplifier is arranged between the first coil terminal and the first control terminal. The second amplifier has a first amplifier input, a second amplifier input, and an amplifier output. The first amplifier input is connected to the first coil terminal. The second amplifier input is connected to the amplifier output via a fourth resistance, and the amplifier output is connected to the first control terminal.

According to one embodiment of the present disclosure, a third resistance is arranged between the first coil terminal and the first control terminal.

According to one embodiment of the present disclosure, the control unit has a filter for analog signal processing.

The aforementioned object is likewise achieved by an inductive conductivity sensor.

The inductive conductivity sensor according to the present disclosure comprises:
a primary coil,
a circuit according to the present disclosure.

The primary coil is connected to the control unit, and the control unit is suitable for sending a stimulation signal to the primary coil in order to detect a measurement signal in the secondary coil.

The aforementioned object is likewise achieved by a method for operating a circuit for an inductive conductivity sensor.

The method according to the present disclosure comprises the following steps:
  providing a circuit according to the present disclosure,
  measuring a measurement signal, wherein the measurement comprises a controlling of the switch by the control unit such that the switch is in its first position, and furthermore comprises an evaluation, by the control unit, of the measurement signal detected in the secondary coil,
  testing the circuit, wherein the testing comprises a controlling of the switch by the control unit such that the switch is in its second position, and furthermore comprises a transmission of a test signal by the control unit at the second control terminal, and furthermore comprises an evaluation of the test response generated by the test signal at the first control terminal.

According to one embodiment of the present disclosure, the test signal is an alternating voltage signal.

According to one embodiment of the present disclosure, the testing step comprises a comparison, by the control unit, of the test signal to the test response.

According to one embodiment of the present disclosure, the method furthermore comprises a step of outputting a state log of the circuit.

The aforementioned object is likewise achieved by a method for testing a circuit for an inductive conductivity sensor.

The method according to the present disclosure comprises the following steps:
  providing a circuit according to the present disclosure,
  testing the circuit, wherein the testing comprises a controlling of the switch by the control unit such that the switch is in its second position, and furthermore comprises a transmission of a test signal by the control unit at the second control terminal, and furthermore comprises an evaluation of the test response generated by the test signal at the first control terminal.

BRIEF DESCRIPTION OF THE DRAWINGS

The present disclosure is explained in more detail on the basis of the following description of Figures. The following are shown.

DETAILED DESCRIPTION

Figure 1:
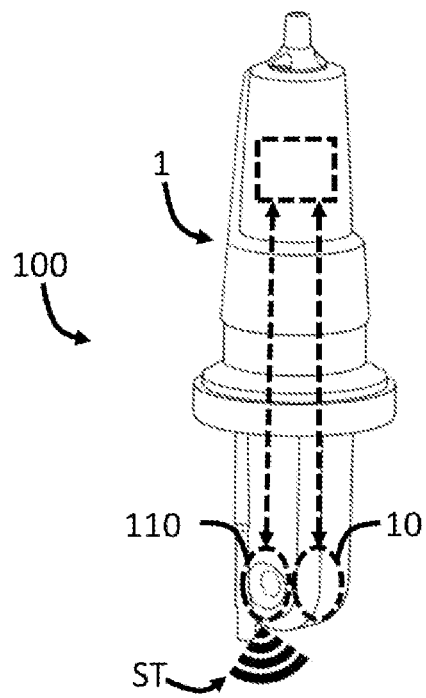
FIG. 1 shows an exemplary representation of an inductive conductivity sensor according to the present disclosure.

FIG. 1 shows an inductive conductivity sensor 100 according to the present disclosure having a primary coil 110 and a secondary coil 10. The primary coil 110 is, for example, the coil which emits a stimulation signal ST. The secondary coil 10 is, for example, the coil which detects the stimulation signal ST emitted by the primary coil 110 and altered by the measurement medium as a measurement signal MS. A control unit 40 is connected to the primary coil 110 and the secondary coil 10 (see FIG. 1).

The inductive conductivity sensor 100 is suitable for being exposed to a measuring medium in order to determine the conductivity of the measurement medium.

Figure 2:
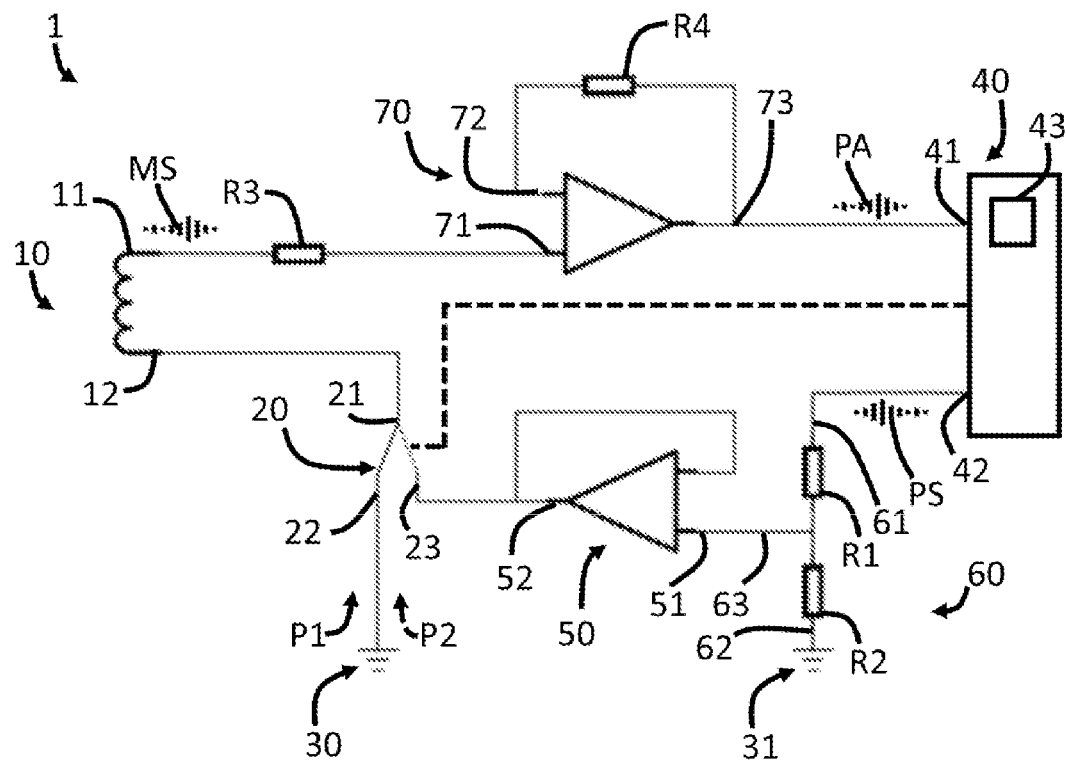
FIG. 2 shows an exemplary representation of a circuit according to the present disclosure for an inductive conductivity sensor.

FIG. 2 shows a circuit 1 according to the present disclosure which is used for controlling at least the secondary coil of the inductive conductivity sensor 100. The circuit 1 comprises the secondary coil 10, a switch 20, a first potential terminal 30, and a control unit 40.

The switch 20 is preferably a multiplexer. The first potential terminal 30 is, for example, the ground potential, or else a different predetermined potential. The control unit 40 is, for example, a microcontroller. The switch 20 is suitable for being arranged in an explosion-prone region.

The secondary coil 10 has a first coil terminal 11 and a second coil terminal 12. The switch 20 has a first switch terminal 21, a second switch terminal 22, and a third switch terminal 23. The control unit 40 has a first control terminal 41 and a second control terminal 42.

The first coil terminal 11 is connected to the first control terminal 41. The second coil terminal 12 is connected to the first switch terminal 21, wherein the second switch terminal 22 is connected to the first potential terminal 30 and the third switch terminal is connected to the second control terminal 42.

The control unit 40 is connected to the switch 20 for controlling its switch position (see dashed line in FIG. 2). The control unit 40 is suitable for switching the switch 20 between a first position P1 in which the first switch terminal 21 is connected to the second switch terminal 22 (see FIG. 2), and a second position P2 in which the first switch terminal 21 is connected to the third switch terminal 23 (see dashed arrow and dashed switch position in FIG. 2). The control unit 40 is suitable for emitting a test signal PS at the second control terminal 42, and is suitable for receiving and evaluating the test signal PS as a test response PA at the first control terminal 41. The transmission of the test signal PS and the reception of the test response PA will be discussed in detail later.

The control unit 40 is connected to the primary coil 110 and is suitable for sending a stimulation signal ST to the primary coil 110 in order to generate, and ultimately to detect, a measurement signal MS in the secondary coil 10. As an alternative to this, the stimulation signal ST can also be generated by a separate further control unit (not shown) of the inductive conductivity sensor 100.

The secondary coil 10 is suitable for detecting the measurement signal MS, and the control unit 40 is suitable for receiving and evaluating the measurement signal MS. The evaluation of the measurement signal MS will be discussed in detail later.

According to one embodiment, which is compatible with the further embodiments described here, a first amplifier 50 and a voltage divider 60 are arranged between the second control terminal 42 and the third switch terminal 23.

The voltage divider 60 has a first resistance R1 and a second resistance R2, as well as a first voltage divider terminal 61, a second voltage divider terminal 62, and a third voltage divider terminal 63. The first voltage divider terminal 61 is connected to the first resistance R1 and to the second control terminal 42. The second voltage divider terminal 62 is connected to the second resistance R2 and a second potential terminal 31. The third voltage divider terminal 63 is arranged between the first resistance R1 and the second resistance R2. The first amplifier 50 has an amplifier input 51 and an amplifier output 52. The first amplifier 50 is, for example, an operational amplifier. The second potential terminal 31 is, for example, a ground potential, or else a different predetermined potential. The amplifier input 51 is connected to the third voltage divider terminal 63, and the amplifier output 52 is connected to the third switch terminal 23.

The first resistance R1 and the second resistance R2 are selected such that a signal that is arriving at the first amplifier 50 via the voltage divider 60 is not too high for the first amplifier 50. In other words, the voltage divider 60 is matched at least to the test signal PS. The first resistance R1 is, for example, several times greater than the second resistance R2. For example, the first resistance R1 is in the megaohm range and the second resistance R2 is, for example, in the kiloohm range.

According to one embodiment (not shown) which is compatible with the further embodiments described here, a filter capacitor is connected between the second control terminal 42 and the first voltage divider terminal 61 of the voltage divider 60. The filter capacitor is suitable for filtering a direct current component. It is thus achieved that the test signal PS is free of direct current components.

According to one embodiment, which is compatible with the further embodiments described here, a second amplifier 70 is arranged between the first coil terminal 11 and the first control terminal 41. The second amplifier 70 is preferably an I/U converter. The second amplifier 70 has a first amplifier input 71, a second amplifier input 72, and an amplifier output 73. The first amplifier input 71 is connected to the first coil terminal 11. The second amplifier input 72 is connected to the amplifier output 73 via a fourth resistance R4, and the amplifier output 73 is connected to the first control terminal 41. The fourth resistance R4 is selected such that it generates a suitable amplification for the circuit. The fourth resistance R4 functions as a feedback resistance for the second amplifier 70, i.e., the I/U converter.

According to one embodiment (not shown) which is compatible with the further embodiment described here, the second amplifier 70 has a capacitor between the first amplifier input 71 and the amplifier output 73. Thanks to this capacitor arranged parallel to the second amplifier 70, an EMC protective circuit is realized.

According to one embodiment which is compatible with the further embodiments described here, a third resistance R3 is arranged between the first coil terminal 11 and the first control terminal 41. The third resistance R3 is preferably suitable for being arranged in an explosion-prone region. Via the third resistance R3, it is achieved that the control unit 40 is protected from excessively high currents. The third resistance R3 has, for example, a resistance between 100 ohms and 1 kohm. The third resistance R3 enables a measurement signal MS coming from the secondary coil 10 to be limited in terms of current.

According to one embodiment which is compatible with the further embodiments described here, the control unit 40 has a filter 43 for analog signal processing. The filter 43 is, for example, a passive filter. An advantage of a passive filter is that this does not enter into oscillation independently of the signal to be filtered. The filter 43 is, for example, an RC element. The filter 43 is, for example, a bandpass filter created from passive and active components.

In one possible embodiment, the filter 43 is an active filter. The advantage of an active filter is that a high filter arrangement can thus be achieved, and a frequency selectivity is thus possible.

In one possible embodiment, the amplification of the filter 43 is adjustable. An advantage of this is that the filter signal can thus be adapted to an analog-to-digital converter present in the control unit 40. The control unit 40 preferably has the analog-to-digital converter at the first control terminal 41 (not shown).

The method for operating the above-described circuit 1 for the above-described inductive conductivity sensor 100 is discussed in the following.

In a first step, the circuit 1 described above is provided. The circuit 1 is preferably arranged in the inductive conductivity sensor 100, or is at least partially arranged in the inductive conductivity sensor 100.

The circuit 1 is preferably used for detecting measurement signals, thus at the secondary coil 10 of the inductive conductivity sensor 100.

As indicated in FIG. 1 by the double arrows and mentioned above with respect to the primary coil 110, the control unit 40 is preferably suitable for also controlling the primary coil 110. This means that the stimulation signal ST, which is applied to the primary coil 110, is generated, for example, by the control unit 40. The stimulation signal ST is influenced by the measurement medium and applied to the secondary coil 10. The primary coil 110 is controllable completely independently of the secondary coil 10.

The method furthermore comprises a step of measuring a measurement signal MS by means of the circuit 1. The step of measuring comprises a controlling of the switch 20 by the control unit 40 such that the switch 20 is brought into its first position P1. If the switch 20 is in its first position P1, the circuit 1 is in a measurement mode. The step of measuring furthermore comprises an evaluation, by the control unit 40, of the measurement signal MS detected in the secondary coil 10.

The method furthermore comprises a step of testing the circuit 1. The testing step comprises a controlling of the switch 20 by the control unit 40 such that the switch 20 is brought into its second position P2. If the switch 20 is in its second position P2, the circuit 1 is in a test mode. The testing step furthermore comprises a transmission of a test signal PS by the control unit 40 at the second control terminal 42. Via the transmission of the test signal PS at the second control terminal 42, the test signal PS passes through several circuit components between the second control terminal 42 and the first control terminal 41 of the control unit 40, depending on the embodiment of the circuit 1. In particular, the test signal PS thus passes through the voltage divider 60, the first amplifier 50, the switch 20, the secondary coil 10, the third resistance R3, the second amplifier 70, and the filter 43 arranged in the control unit 40. The test signal PS is preferably output several times by the control unit 40, wherein the frequency of the test signal PS is preferably varied per test pass. For example, via the frequency change it is possible to test various test criteria or certain components of the circuit 1.

At this point, it is noted that the step of measuring and of testing can also be interchanged as desired and/or can respectively be repeated as desired.

The testing step furthermore comprises an evaluation, by the control unit 40, of the test response PA generated by the test signal PS. The test response PA is thus a test signal PS modified by the test signal PS passing through the circuit components.

The step of evaluating the test response PA comprises a comparison of the test response PA with the test signal PS, i.e., an evaluation of a difference between the test signal PS and the test response PA. In particular, the phase shift and/or the change in amplitude and/or the amplification or attenuation between test signal PS and test response PA and/or the form difference between the test signal PS and the test response PA is hereby analyzed. For example, in the step of evaluating the test response PA, in particular a periodic signal, for example a square wave signal is evaluated, and of this in particular a square wave signal edge of the square wave signal.

Wherein the step of evaluating the test response PA comprises a comparison of the test signal PS and the test response PA in order to deduce, for example, the impedance of the circuit components passed through by the test signal PS, and to compare this determined impedance with a reference impedance stored in the control unit 40.

Wherein, if the step of evaluating the test response PA yields that the test response PA is less than a threshold value, for example is equal to zero, the secondary coil 10 must be defective.

The test signal PS is preferably an alternating voltage signal or alternating current signal. The advantage of an alternating voltage signal is that only one alternating signal arrives via the filter 43, in particular in the event of a band-pass. The alternating voltage signal is, for example, a sinusoidal signal, a square wave signal, a triangular signal, or an alternating voltage signal of a different form. The frequency of the alternating voltage signal is preferably set such that it corresponds to the measurement frequency (band-pass frequency). The amplitude of the alternating voltage signal is preferably set such that the alternating voltage signal is optimally matched to the circuit components of the circuit 1.

According to one alternative embodiment, a DC voltage signal or DC current signal is selected as a test signal PS.

In a further step, a step of outputting a state log via the circuit 1 takes place after the testing step. The outputting of the state log preferably comprises an indication of which circuit components are defect-free or defective. In particular, an indication is output as to whether or not an interturn fault or an open circuit is present in the secondary coil 10. If, as described above, it is thus noted in the evaluation of the test response PA that the test response PA falls below a limit value, thus is, for example, equal to zero, an open circuit of the secondary coil 10 must be present. In this event, the output notification, for example, comprises the message: "Caution, a break in the secondary coil is present!"

Thanks to the circuit and the test method, it is achieved to test the defect-free function of the circuit components. The test method moreover enables that no conductor loop must be connected in order to test the function of secondary coil 10. Thus, no reference resistances are required, and the signal quality of the signals measured in the measurement mode is not distorted by the conductor loop.

A better measurement quality is achieved thanks to the circuit and the measuring method. In particular, thanks to the circuit, the sensitive circuit part of the receiving side is independent of the transmission side.

Thanks to the circuit and the test method, the impedance of the transmission path, i.e., between the first control terminal 41 and the second control terminal 42 of the control unit 40, can furthermore be determined. Anomalies of the components of the transmission path are thus likewise detectable. Given an anomaly detected in the transmission path, a warning message is output to the user, for example, and a possible defective component is identified depending on the anomaly.

What is claimed is:

1. A circuit for an inductive conductivity sensor, the circuit comprising:
   a secondary coil having a first coil terminal and a second coil terminal;
   a switch having a first switch terminal, a second switch terminal, and a third switch terminal, wherein in a first switch position the first switch terminal is connected to the second switch terminal and wherein in a second switch position the first switch terminal is connected to the third switch terminal;
   a first potential terminal;
   a first amplifier;
   a voltage divider having a first resistance and a second resistance; and
   a control unit having a first control terminal and a second control terminal,
   wherein the first amplifier and the voltage divider are arranged between the second control terminal and the third switch terminal,
   wherein the first coil terminal is connected to the first control terminal and the second coil terminal is connected to the first switch terminal, wherein the second switch terminal is connected to the first potential terminal and the third switch terminal is connected to the second control terminal,
   wherein the voltage divider has a first voltage divider terminal which is connected to the first resistance and to the second control terminal, a second voltage divider terminal which is connected to the second resistance and to a second potential terminal, and a third voltage divider terminal which is arranged between the first resistance and the second resistance,
   wherein the first amplifier has an amplifier input which is connected to the third voltage divider terminal and has an amplifier output which is connected to the third switch terminal,
   wherein the control unit is embodied to switch the switch between the first position for a measuring mode and the second position for a testing mode,
   wherein the control unit is further embodied in the testing mode to emit a test signal at the second control terminal and to receive and evaluate the test signal as a test response at the first control terminal, and
   wherein in the measuring mode the secondary coil is suitable for detecting a measurement signal and the control unit is further embodied to receive and evaluate the measurement signal at the first control terminal.

2. The circuit according to claim 1, further comprising:
   a second amplifier arranged between the first coil terminal and the first control terminal,
   wherein the second amplifier has a first amplifier input, a second amplifier input, and an amplifier output,
   wherein the first amplifier input is connected to the first coil terminal, the second amplifier input is connected to the amplifier output via a fourth resistance, and the amplifier output is connected to the first control terminal.

3. The circuit according to claim 2, further comprising:
   a third resistance arranged between the first coil terminal and the first control terminal.

4. The circuit according to claim 1, wherein the control unit includes a filter for analog signal processing.

5. An inductive conductivity sensor, comprising:
   a primary coil; and
   a circuit, including:
      a secondary coil having a first coil terminal and a second coil terminal;
      a switch having a first switch terminal, a second switch terminal, and a third switch terminal, wherein in a first switch position the first switch terminal is connected to the second switch terminal and wherein in a second switch position the first switch terminal is connected to the third switch terminal;
a first potential terminal;
a first amplifier;
a voltage divider having a first resistance and a second resistance; and
a control unit having a first control terminal and a second control terminal,
wherein the first amplifier and the voltage divider are arranged between the second control terminal and the third switch terminal,
wherein the first coil terminal is connected to the first control terminal and the second coil terminal is connected to the first switch terminal, wherein the second switch terminal is connected to the first potential terminal and the third switch terminal is connected to the second control terminal,
wherein the voltage divider has a first voltage divider terminal which is connected to the first resistance and to the second control terminal, a second voltage divider terminal which is connected to the second resistance and to a second potential terminal, and a third voltage divider terminal which is arranged between the first resistance and the second resistance,
wherein the first amplifier has an amplifier input which is connected to the third voltage divider terminal and has an amplifier output which is connected to the third switch terminal,
wherein the control unit is embodied to switch the switch between the first position for a measuring mode and the second position for a testing mode,
wherein the control unit is further embodied in the testing mode to emit a test signal at the second control terminal and to receive and evaluate the test signal as a test response at the first control terminal, and
wherein in the measuring mode the secondary coil is suitable for detecting a measurement signal and the control unit is further embodied to receive and evaluate the measurement signal at the first control terminal,
wherein the primary coil is connected to the control unit, and the control unit is further embodied in the measuring mode to send a stimulation signal to the primary coil in order to detect a measurement signal in the secondary coil.

6. A method for operating a circuit for an inductive conductivity sensor, the method comprising:
providing the circuit, including:
a secondary coil having a first coil terminal and a second coil terminal;
a switch having a first switch terminal, a second switch terminal, and a third switch terminal, wherein in a first switch position the first switch terminal is connected to the second switch terminal and wherein in a second switch position the first switch terminal is connected to the third switch terminal;
a first potential terminal;
a first amplifier;
a voltage divider having a first resistance and a second resistance; and
a control unit having a first control terminal and a second control terminal,
wherein the first amplifier and the voltage divider are arranged between the second control terminal and the third switch terminal,
wherein the first coil terminal is connected to the first control terminal and the second coil terminal is connected to the first switch terminal, wherein the second switch terminal is connected to the first potential terminal and the third switch terminal is connected to the second control terminal,
wherein the voltage divider has a first voltage divider terminal which is connected to the first resistance and to the second control terminal, a second voltage divider terminal which is connected to the second resistance and to a second potential terminal, and a third voltage divider terminal which is arranged between the first resistance and the second resistance,
wherein the first amplifier has an amplifier input which is connected to the third voltage divider terminal and has an amplifier output which is connected to the third switch terminal,
wherein the control unit is embodied to switch the switch between the first position for a measuring mode and the second position for a testing model,
wherein the control unit is further embodied in the testing mode to emit a test signal at the second control terminal and to receive and evaluate the test signal as a test response at the first control terminal, and
wherein in the measuring mode the secondary coil is suitable for detecting a measurement signal and the control unit is further embodied to receive and evaluate the measurement signal at the first control terminal;
in the measuring mode, measuring a measurement signal, wherein the measuring includes a controlling of the switch by the control unit such that the switch is in its first position, and further includes an evaluating by the control unit of the measurement signal detected in the secondary coil; and
in the testing mode, testing the circuit, wherein the testing includes a controlling of the switch by the control unit such that the switch is in its second position, and further includes a transmitting of a test signal by the control unit at the second control terminal, and further includes an evaluating of the test response generated by the test signal at the first control terminal.

7. The method according to claim 6, wherein the test signal is an alternating voltage signal.

8. The method according to claim 6, wherein the testing step includes a comparison, by the control unit, of the test signal with the test response.

9. The method according to claim 8, wherein the method further comprises a step of outputting a state log of the circuit.

10. A method for testing a circuit for an inductive conductivity sensor, the method comprising:
providing a circuit, including:
a secondary coil having a first coil terminal and a second coil terminal;
a switch having a first switch terminal, a second switch terminal, and a third switch terminal, wherein in a first switch position the first switch terminal is connected to the second switch terminal and wherein in a second switch position the first switch terminal is connected to the third switch terminal;
a first potential terminal;
a first amplifier;
a voltage divider having a first resistance and a second resistance; and a control unit having a first control terminal and a second control terminal, wherein the first amplifier and the voltage divider are arranged between the second control terminal and the third switch terminal, wherein the first coil terminal is connected to the first control terminal and the second coil terminal is connected to the first switch terminal, wherein the second switch terminal is connected to the first potential terminal and the third switch terminal is connected to the second control terminal, wherein the voltage divider has a first voltage divider terminal which is connected to the first resistance and to the second control terminal, a second voltage divider terminal which is connected to the second resistance and to a second potential terminal, and a third voltage divider terminal which is arranged between the first resistance and the second resistance, wherein the first amplifier has an amplifier input which is connected to the third voltage divider terminal and has an amplifier output which is connected to the third switch terminal, wherein the control unit is embodied to switch the switch between the first position for a measuring mode and the second position for the testing mode, wherein the control unit is further embodied in the testing mode to emit a test signal at the second control terminal and to receive and evaluate the test signal as a test response at the first control terminal, and wherein in the measuring mode the secondary coil is suitable for detecting a measurement signal and the control unit is further embodied to receive and evaluate the measurement signal at the first control terminal;

testing the circuit in the testing mode, wherein the testing includes a controlling of the switch by the control unit such that the switch is in its second position, and further includes a transmitting of a test signal by the control unit at the second control terminal, and further includes an evaluating of the test response generated by the test signal at the first control terminal.

* * * * *